(12) United States Patent
Okada

(10) Patent No.: US 6,398,372 B1
(45) Date of Patent: Jun. 4, 2002

(54) DEFORMABLE MIRROR FOR LASER BEAM

(75) Inventor: Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/504,897

(22) Filed: Feb. 16, 2000

(30) Foreign Application Priority Data

Feb. 17, 1999 (JP) ............................................. 11-038777

(51) Int. Cl.⁷ ............................. G02B 5/08; G02B 7/182
(52) U.S. Cl. ..................... 359/846; 359/847; 359/872; 359/900
(58) Field of Search ................................ 359/845, 846, 359/847, 849, 872, 900

(56) References Cited

U.S. PATENT DOCUMENTS

| | | | |
|---|---|---|---|
| 840,084 A | * 1/1907 | Muller | 359/846 |
| 2,129,513 A | * 9/1938 | Wegener | 359/846 |
| 3,031,928 A | * 5/1962 | Kopito | 359/847 |
| 3,514,776 A | * 5/1970 | Mulready | 359/847 |
| 3,817,606 A | * 6/1974 | Locke et al. | |
| 3,893,755 A | * 7/1975 | Cobarg et al. | |
| 4,243,301 A | * 1/1981 | Powell | 359/847 |
| 4,487,196 A | * 12/1984 | Murphy | |
| 4,981,720 A | 1/1991 | Servais | |
| 5,020,895 A | * 6/1991 | Giesen et al. | 359/847 |
| 5,094,519 A | * 3/1992 | Ealey et al. | 359/845 |
| 5,754,219 A | 5/1998 | Ruckl | |
| 6,021,153 A | * 2/2000 | Okada | |

FOREIGN PATENT DOCUMENTS

| | | | |
|---|---|---|---|
| DE | 37 10334 | 10/1988 | |
| DE | 41 37 831 A1 | 5/1993 | |
| EP | 1030206 | * 8/2000 | 359/846 |
| JP | 407181414 | * 7/1995 | 359/846 |
| JP | 8-39282 | 2/1996 | |
| JP | 9-293915 | 11/1997 | |
| WO | WO97/12267 | 4/1997 | |

* cited by examiner

Primary Examiner—Ricky D. Shafer
(74) Attorney, Agent, or Firm—McDermott, Will & Emery

(57) ABSTRACT

A reflecting mirror of a deformable mirror for laser beam is disclosed, which is produced having a high heat conductivity, a low Young's modulus and a high 0.2% yield strength, so as to realize high precision of shape control of the reflecting surface and broadening of the control range. The reflecting mirror is made of a copper alloy comprising copper having 3% by weight or less of magnesium and 1% by weight or less of phosphorous added thereto, or aluminum, an aluminum alloy, copper or a copper alloy, having been subjected to cold working, or subjected to cold working and then heat treatment.

8 Claims, 1 Drawing Sheet

DEFORMABLE MIRROR FOR LASER BEAM

BACKGROUND OF THE INVENTION

1. Technical Field of the Invention

The present invention relates to a reflecting mirror, the shape of which can be variably controlled by elastic deformation, and more particularly, a deformable mirror for laser beam having a high power density. The deformable mirror is contemplated to be used for beam propagation in a laser processing machine or in an oscillator, and optional adjustment or correction of the beam diameter at a focus point, the focus position and the beam mode can be conducted by controlling the shape of the reflecting mirror.

2. Description of the Related Art

Pure copper is generally used as the raw material of a deformable mirror for laser beam. This is because by using pure copper with good heat conduction, a part of the laser beam having a high power density is absorbed at the surface thereof and is emitted by heat conduction, thereby suppressing thermal strain.

Another reason that pure copper is used is because of its good workability in that it can be processed into a mirror finished surface having high accuracy of surface figures by diamond turning or polishing.

As techniques referring to a material of a deformable mirror for laser beam, the following can be exemplified.

(1) Japanese Patent Application Laid-open No. Hei 8-39282 teaches to use brass (an alloy mainly containing copper and zinc) having a fine structure disclosed in German Patent No. 3,710,334, which is a material that has high strength against so-called plastic deformation, which remains even after removing the force causing the deformation.

(2) In Japanese Patent Application Laid-open No. Hei 9-293915 a soft material having a Vickers' hardness of 60 or less is used in consideration of its easy deformation.

A material for a reflecting mirror used as a deformable mirror for laser beam having a high power density must satisfy the following requirements (a) to (c), which enable a practical use.

(a) It has high heat conductivity, and thus part of a laser beam is absorbed at the surface thereof and is emitted by heat conduction, thereby suppressing thermal strain (high heat conductivity).

(b) It has a low Young's modulus, and deformation of the reflecting mirror with pressure can easily occur (low Young's modulus).

(c) It has high 0.2% yield strength. If the 0.2% yield strength (namely, stress at which plastic deformation of 0.2% is yielded.) of a material is high, it has higher restorative capability, namely, less plastic deformation, upon removal of the force causing the deformation. As a result, a wider range of controllable deformation can be obtained.

The conventionally proposed reflecting mirrors comprising brass are excellent in the 0.2% yield strength, but have low heat conductivity, and it is difficult to suppress the thermal strain to a small value.

In the invention disclosed by the present inventors in Japanese Laid-open Patent Application No. Hei 9-293915, copper, a copper alloy, aluminum and an aluminum alloy are exemplified as specific examples of a soft material having a Vickers' hardness of 60 or less. However, these materials involve a problem in 0.2% yield strength, and have a narrow range where deformation control can be conducted. Thus, when it is deformed beyond the control range, it suffers plastic deformation.

SUMMARY OF THE INVENTION

The invention aims to provide a deformable mirror for laser beam that satisfies all the requirements (a) to (c) described above.

Because the material for a reflecting mirror used in a deformable mirror for laser beam must have both high heat conductivity and a low Young's modulus at the same time, pure copper, pure aluminum or an alloy comprising copper or aluminum as a base material, to which a slight amount of an additive is added, is suitable therefor. By increasing the 0.2% yield strength of the material while maintaining high heat conductivity and a low Young's modulus thereof to the extent possible, the requirements (a), (b) and (c) can be satisfied at the same time.

In order to attain this aim, the invention provides a deformable mirror for laser beam comprising a reflecting mirror having a shape that is variably controlled, the reflecting mirror being made of a copper alloy comprising copper having 3% by weight or less of magnesium and 1% by weight or less of phosphorous added thereto.

The copper alloy preferably comprises copper having 0.1 to 1% by weight of magnesium and 0.001 to 0.01% by weight of phosphorous added thereto.

As another means for increasing the 0.2% yield strength, aluminum, an aluminum alloy, copper or a copper alloy is used after being subjected to cold working or after being subjected to cold working and then heat treatment.

The invention therefore also aims to provide a deformable mirror for laser beam comprising a reflecting mirror having a shape that is variably controlled, the reflecting mirror comprising aluminum, an aluminum alloy, copper or a copper alloy having been subjected to cold working, or subjected to cold working and then heat treatment.

When the material used after being subjected to cold working or after being subjected to cold working and then heat treatment is a copper alloy containing magnesium and phosphorous as described above, the increase of the 0.2% yield strength can be fully achieved. In the case of the copper alloy containing magnesium and phosphorous, a working reduction of cold working is preferably 10% or more, and heat treatment temperature is preferably 600° C. or lower.

DETAILED DESCRIPTION OF THE INVENTION

Figure 1:
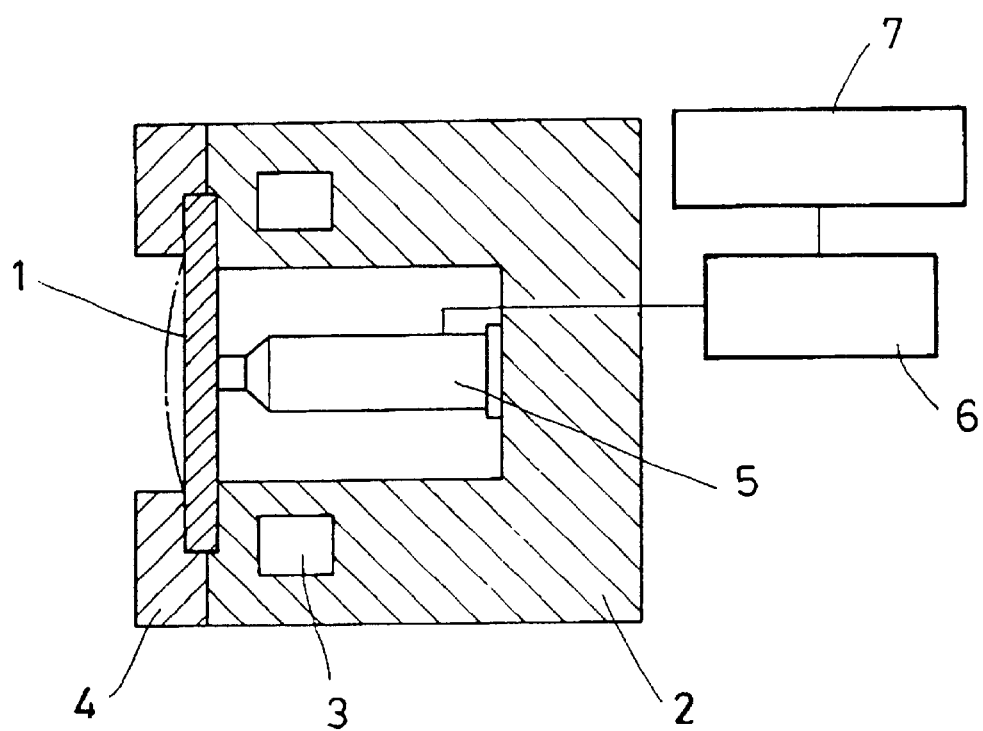
FIG. 1 is a schematic view showing an embodiment of the deformable mirror for laser beam according to the invention.

A copper alloy having magnesium and phosphorous added thereto is excellent in the 0.2% yield strength in comparison to pure copper. For example, in the case of a copper alloy having 0.1 to 1% by weight of magnesium and 0.001 to 0.01% by weight of phosphorous added thereto, the 0.2% yield strength is about 30 kg/mm$^2$ at most, which is about 5 times that of pure copper (6 kg/mm$^2$). The copper alloy having the same composition has a heat conductivity of 264 W/m·sec, which is about two thirds of that of pure copper, but is still two times or more that of other copper alloys, such as brass and phosphor bronze. The copper alloy has a Young's modulus of 125,000 N/mm$^2$, which is comparable to that of pure copper. Therefore, the copper alloy satisfies all the requirements (a), (b) and (c) described above.

The 0.2% yield strength can also be increased by a method of subjecting a material to cold working (plastic deformation by cold rolling or cold forging) to conduct work hardening, and a method of subjecting a material to cold working and then to heat treatment to conduct grain refining of crystal grains in the texture. The aim of the invention can be attained through a reflecting mirror made of pure copper, a copper alloy, pure aluminum or an aluminum alloy, having been subjected to the above-described treatment. However, pure aluminum and an aluminum alloy are inferior in heat conductivity to copper. Nonetheless, aluminum and an aluminum alloy are lightweight and therefore are useful as a reflecting mirror for a laser system that requires mobility, such as a laser robot.

A preferred combination of the material, the working and the heat treatment was such that a copper alloy having 0.1 to 1% by weight of magnesium and 0.001 to 0.01% by weight of phosphorous added thereto was subjected to cold working with a working reduction of 10% or more and then to heat treatment at a temperature of 600° C. or lower. In particular, a working reduction of about 60% and a heat treatment temperature of about 520° C. were optimum.

When the added amounts of magnesium and phosphorous exceeded 3% by weight and 1% by weight, respectively, the heat conductivity was considerably decreased to provide an adverse effect.

When the working reduction of the cold working was less than 10%, the effect of the cold working was not sufficient to obtain a satisfactory 0.2% yield strength. Furthermore, in a material subjected to heat treatment at a temperature higher than 600° C., the crystal grains thereof were enlarged, which caused decrease in the 0.2% yield strength.

According to the invention, as described in the foregoing, by adopting a reflecting mirror suitable for deformation control which was made of a copper alloy having magnesium an d phosphorous added thereto to increase the 0.2% yield strength, or of aluminum, an aluminum alloy, copper or a copper alloy subjected to cold working or to cold working and heat treatment to increase the 0.2% yield strength, all of the high heat conductivity, the low Young's modulus and the high 0.2% yield strength were simultaneously satisfied, which proved to enable highly accurate shape control in a wide range, thereby enabling a laser working apparatus and the like to achieve high performance.

FIG. 1 is a schematic view showing an embodiment of the deformable mirror for laser beam according to the invention. In FIG. 1, numeral 1 denotes a deformable reflecting mirror, 2 denotes a mirror mount having a cooling water channel 3, 4 denotes a fixing device for the reflection mirror 1, and 5 denotes a piezoelectric actuator connected to a control power source 7 via an amplifier 6. The piezoelectric actuator 5 in this embodiment is a PZT actuator using a piezoelectric body comprising $Pb(Zr,Ti)O_3$. The reflecting mirror 1 is deformed to the shape expressed by the dotted line by pressurizing with the actuator 5. The deformation amount is controlled by adjusting the voltage impressed to the piezoelectric actuator 5.

Copper alloys having added amounts of magnesium and phosphorous varying within the range of 3% by weight or less and 1% by weight or less, respectively; aluminum, an aluminum alloy, copper and a copper alloy, each having been subjected to cold working; and aluminum, an aluminum alloy, copper and a copper alloy, each having been subjected to cold working and then to heat treatment, were used as raw materials for producing the reflecting mirror. Reflecting mirrors having a circular deformation part having a diameter of 64 mm were shaved from the materials, and subjected to mirror finishing. The mirror finishing was conducted by a diamond turning method (i.e., the so-called SPDT processing) using an ultra-precision lathe. The reflecting mirror 1 thus produced was fabricated into a deformable mirror shown in FIG. 1, and was deformed by the piezoelectric actuator 5 to operate as the deformable mirror.

Table 1 shows the cold working reduction and the heat treatment temperature of the materials used in the experiment.

TABLE 1

|  | Working reduction | Heat treatment temperature |
| --- | --- | --- |
| Aluminum | 60% | 200° C. |
| Aluminum alloy | depending on composition | depending on composition (≧200° C.) |
| Copper | 60% | 250° C. |
| Copper alloy | depending on composition | depending on composition (≧250° C.) |

As a result, the reflecting mirrors made of the materials described above proved to attain a larger deformable amount without causing plastic deformation as compared with reflecting mirrors made of pure copper which had an advantage of smaller thermal strain only. Furthermore, the thermal strain of the reflecting mirrors according to the invention was smaller than that of reflecting mirrors made of brass which were made only in consideration of resistance to plastic deformation.

For example, with the reflecting mirrors made of pure copper the deformable amount available without causing plastic deformation was 30 $\mu$m. On the other hand, the deformable amount of the reflecting mirrors made of a copper alloy having 0.1 to 1% by weight of magnesium and 0.001 to 0.01% by weight of phosphorous added thereto, and subjected to cold working with a working reduction of about 60% reached the maximum value of 60 $\mu$m or more in the maximum displacement at the central part. The displacement of 60 $\mu$m or more has not been determined because it exceeds the stroke limit of the piezoelectric actuator used. However, in the case where the reflecting mirror is used for high output laser of 1 kW or more, because working strain due to cold working remains in the material, the temperature increase caused by absorption of the laser beam at the surface releases the working strain to generate plastic deformation. Therefore, it has been found that a material subjected only to cold working is useful only for a low output laser of 1 kW or less.

Consequently, it has been found that for use in a high output laser of 1 kW or more, a suitable material is one which is subjected to cold working and then heat treatment at 520° C. (although improvement in 0.2% yield strength by work hardening is not expected) to improve the 0.2% yield strength by making the crystal grains fine. In this case, the allowable maximum displacement at the central part is 50 $\mu$m, the value of which is smaller than that of the material subjected only to cold working, but it can be understood that this is most suitable by considering the shape stability when the temperature increases. The thermal strain caused by irradiation with a laser beam in this case is only a slight value of 1 $\mu$m or less per 1kW (86.5% beam diameter: 13). The thermal strain is not plastic deformation, but the reflecting mirror is restored to its original shape when the laser irradiation is terminated.

The shape of the reflecting mirror 1 is not limited to the plane shape shown in FIG. 1. As described in Japanese Patent Application Laid-open No. Hei 9-293915, the thickness of the reflecting mirror can be increased from the peripheral part toward the central part in the back surface in order to make uniform the amount of deformation caused by the difference in bending moment applied to the parts in the radial direction.

Other experiments were carried out to investigate the effect of the degree of cold working and the heat treatment.

An experiment on cold working reduction of 40% and 80% and heat treatment at 450 degrees C and 550 degree C was conducted on copper alloy having 0.1 to 1% by weight of magnesium and 0.001 to 0.01% by weight of phosphorous added thereto. As a result, the deformable amount of the reflecting mirrors produced with the above-described conditions was between 35 to 45 $\mu$m.

What is claimed is:

1. A deformable mirror for laser beam, the deformable mirror having a 0.2% yield strength no greater than about 30 kg/mm$^2$ and comprising a reflecting mirror having a shape that is variably controlled, said reflecting mirror being made of a copper alloy comprising copper, magnesium in an amount up to 3% by weight, and phosphorus in an amount up to 1% by weight.

2. A deformable mirror for laser beam as claimed in claim 1, wherein said reflecting mirror is made of a material produced by subjecting said copper alloy to cold working.

3. A deformable mirror for laser beam as claimed in claim 1, wherein said reflecting mirror is made of a material produced by subjecting said copper alloy to cold working with a working reduction of 10% or more and then to a heat treatment at a temperature of 600° C. or lower.

4. A deformable mirror for laser beam as claimed in claim 3, wherein said reflecting mirror is made of a material produced by subjecting said copper alloy to cold working with a working reduction of 10% to 80% and then to a heat treatment at a temperature of 450° C. to 600° C.

5. A deformable mirror for laser beam as claimed in claim 4, wherein said reflecting mirror is made of a material produced by subjecting said copper alloy to cold working with a working reduction of 40% to 80% and then to a heat treatment at a temperature of 450° C. to 550° C.

6. A deformable mirror for laser beam comprising a reflecting mirror having a shape that is variably controlled, said reflecting mirror being made of a copper alloy comprising copper, 0.1 to 1% by weight of magnesium and 0.0001 to 0.0% by weight of phosphorous.

7. A deformable mirror for laser beam as claimed in claim 6, wherein said copper alloy comprises copper having 0.1 to 1% by weight of magnesium and 0.001 to 0.01% by weight of phosphorous added thereto, having been subjected to cold working.

8. A deformable mirror for laser beam as claimed in claim 6, wherein said copper alloy is made of a material produced by subjecting it to cold working with a working reduction of 10% or more, and then to a heat treatment at a temperature of 600° C. or lower.

* * * * *

UNITED STATES PATENT AND TRADEMARK OFFICE
CERTIFICATE OF CORRECTION

PATENT NO.    : 6,398,372 B1
DATED         : June 4, 2002
INVENTOR(S)   : Takeshi Okada It is certified that error appears in the above-identified patent and that said Letters Patent is hereby corrected as shown below:

<u>Column 6,</u>
Line 17, change "0.0%" to -- 0.01% --.

Signed and Sealed this

Twenty-first Day of January, 2003

JAMES E. ROGAN
*Director of the United States Patent and Trademark Office*